UNITED STATES PATENT OFFICE.

EDWIN TAYLOR, OF FARMINGDALE, NEW YORK, ASSIGNOR TO UNION CLAY PRODUCTS COMPANY, OF NEW YORK, N. Y., A CORPORATION OF NEW JERSEY.

PROCESS OF VULCANIZATION.

1,017,926.  Specification of Letters Patent.  Patented Feb. 20, 1912.

No Drawing.  Application filed May 14, 1910. Serial No. 561,466.

*To all whom it may concern:*

Be it known that I, EDWIN TAYLOR, a citizen of the United States, and resident of Farmingdale, Long Island, New York, have invented certain new and useful Improvements in Processes of Vulcanization, of which the following is a specification.

This invention relates to the manufacture of a composition which is adapted for use as a waterproof coating or layer, is capable of being molded to different forms to produce vessels of a character to hold or resist the action of liquids, which is a non-conductor of electricity, and which is therefore available for insulating and for other purposes. The composition includes a vulcanized or similarly treated oil or resin. I ordinarily use sulfur as the vulcanizing agent, and I refer to the operation as vulcanization, but it is to be understood that other allied substances such as selenium may be used producing a somewhat analogous operation and result.

The main object of the present invention is to secure more accurate control of the vulcanizing operation, whereby a more uniform product is produced and its character is more easily and accurately regulated.

Other objects and advantages will be apparent from the following description.

The novel features of my invention will furthermore be understood by those skilled in the art from the following detailed description of the various steps followed in carrying out the process.

It has heretofore been proposed to vulcanize linseed oil, cotton seed oil, or other vulcanizable oil, and to mix therewith a clay to form compositions having many of the characteristics of compositions made from rubber. The character of the composition produced varies with the extent to which the vulcanization is carried and the character and proportions of the ingredients used.

I have found that in vulcanizing oil as above indicated it is difficult to secure with accuracy the right proportions of oil and sulfur to get any particular desired result in the product, and it is also difficult to make the sulfur act uniformly upon all parts of the oil.

I have discovered that the difficulties may be overcome and good results may be secured by first vulcanizing or similarly treating a body of oil in the presence of an excess of sulfur, or other allied substance, whereby the product which I call over-vulcanized oil will be uniform, but will be vulcanized beyond the point desired, containing an excess of sulfur or allied substance, and by then thoroughly mixing this over-vulcanized product with vulcanizable oil at a vulcanizing temperature. It is preferable to mix clay with the vulcanizing agent before it is added to the oil, since the presence of the clay tends to prevent frothing and violent reaction.

The vulcanized product above mentioned is in the form of a spongy mass which may be ground and added to the unvulcanized oil in the form of minute particles which will remain in suspension in the oil. These particles may be easily stirred into the oil, and will give up a part of their sulfur to the oil producing a uniform vulcanized product, and it will be obvious that the extent of the vulcanization in the final product can be easily and accurately controlled by varying the proportions of the spongy mass and oil. I find that it is not only possible to get a more uniform final product by this method of procedure than by bringing sulfur and oil together in the usual way, but that it is also possible to regulate the degree of vulcanization in the final product much more accurately, and consequently its character can be controlled with certainty.

In order to give a more accurate idea of my process I will describe in detail one application of it, but it is to be understood that the invention is not confined to the exact order of steps or to the exact proportions set forth in that illustration since they may be varied within wide limits.

I may take 100 parts by weight linseed oil, cotton seed oil, or other oil or resin capable of being vulcanized, and heat it to a vulcanizing temperature, say 350° to 400°

F. I then thoroughly mix 60 parts or more of sulfur and 40 parts of clay and add this mixture to the hot oil maintaining the temperature as above indicated. The mixture of oil, sulfur and clay is continuously stirred and in about fifteen minutes vulcanization will commence and in about thirty minutes it will be completed. The presence of the clay has an effect in checking frothing and violent reactions. The result of this operation is a spongy mass containing an excess of sulfur. The percentage of sulfur may exceed the percentage of oil or resin. This mass will be elastic and rubber-like, or hard according to the excess of sulfur used. It is then finely ground and is added to a body of vulcanizable oil or resin, maintained at a temperature of 350° to 400°. It will float on and in the oil and may be thoroughly mixed therewith by stirring. It will give up some of its sulfur to said oil producing a uniformly vulcanized mass. The proportions in which the spongy mass and oil are combined depend upon the character of the product desired.

The final vulcanized product above described may be combined with finely pulverized clay in any proportions desired, it being understood that the product gets harder as the proportion of clay is increased. As much as ninety per cent. clay may be used, but the product will then be very hard. Instead of adding the clay after the complete vulcanizing operation it may be added to the oil with the ground spongy mass, and this is advantageous where the clay contains sulfur or metallic sulfids which would assist in the operation.

In order to get a soft pliable elastic material, such as is adapted for use as roofing, flooring, steam packing, etc., I produce the spongy mass in rubber-like condition, as above described, and mix it with a vulcanizable oil continuing the heat to get the final vulcanized mass as indicated, and after allowing this mass to cool, I add to it more of the spongy rubber-like mass without performing any further vulcanizing operation. The elasticity will increase in proportion to the rubber-like material added. If clay is added with the rubber-like material the product will be hard with lower elasticity, and if the proportion of clay is increased the product will approach vulcanite in characteristics. If instead of adding the rubber-like material I add clay alone the product will be hard and flexible, but less elastic, the hardness increasing and the flexibility decreasing with an increase in the amount of clay. This product will make good condenser plates, storage battery separators, etc., and if made sufficiently hard is adapted for push buttons, switch boards, insulators, etc.

In making a product for steam packing I preferably add part clay and part graphite with or without the addition of fibrous material to the final vulcanized product above mentioned and thoroughly combine the parts.

In order to get a very flexible material, the spongy, rubber-like mass above mentioned may be added to nitrated oil or resin instead of to vulcanizable oil, and the mixture raised to a vulcanizing temperature, whereby part of the nitro-radical in the nitrated oil is replaced by sulfur. The resulting compound is well adapted for any condition of service in which great flexibility and elasticity are required.

It will be understood that the spongy mass which is described as containing an excess of sulfur has in it free sulfur in addition to that which is combined with the oil in the vulcanizing operation. I have found by experiment, where a mixture containing 100 parts of oil, 50 parts of sulfur and 40 parts of clay is used the result is a mass which is very elastic under compression and apparently containing all of its sulfur in combination, and thus in this mass there is no excess of sulfur. Where the proportion of sulfur is increased however, as in the illustration given above, free sulfur will be found in the product. As another illustration I may take 100 parts of oil, 150 parts of sulfur and 40 parts of clay, in which case a spongy mass is produced which is very hard, containing a large percentage of free sulfur.

Without limiting myself to the proportions and treatment set forth, what I claim is:

1. The process of vulcanizing oil or resin, consisting in maintaining the oil at a vulcanizing temperature in the presence of a vulcanizing agent, until the vulcanizing operation is completed and mixing the product so produced with oil or resin maintained at a vulcanizing temperature.

2. The process of vulcanizing oil or resin, consisting in maintaining the oil at a vulcanizing temperature in the presence of a vulcanizing agent and clay until the vulcanizing operation is completed, and mixing the product so produced with oil or resin maintained at a vulcanizing temperature.

3. The process of vulcanizing oil or resin, consisting in maintaining the oil at a vulcanizing temperature in the presence of sulfur and clay containing sulfur until the vulcanizing operation is completed, and mixing the product so produced with oil maintained at a vulcanizing temperature.

4. The process of vulcanizing oil or resin, consisting in maintaining the oil at a vulcanizing temperature in the presence of an excess of a vulcanizing agent until the vulcanizing operation is completed, and mixing the product so produced with oil or resin maintained at a vulcanizing temperature.

5. The process of vulcanizing oil or resin, consisting in maintaining the oil at a vulcanizing temperature in the presence of an excess of sulfur until the vulcanizing operation is completed, and mixing the product so produced with oil or resin maintained at a vulcanizing temperature.

6. The herein described process, consisting in mixing a vulcanized oil or resin containing an excess of sulfur with a vulcanizable oil, and heating the mixture until vulcanization of the mixture is uniform.

7. The herein described process, consisting in mixing a vulcanized oil or resin containing an excess of the vulcanizing agent with a vulcanizable oil, and heating the mixture until vulcanization of the mixture is uniform.

8. The herein described process, consisting in mixing a vulcanized oil or resin containing an excess of sulfur with a nitrated oil or resin, and heating the mixture until vulcanization of the mixture is uniform.

9. The herein described process, consisting in mixing a vulcanized oil or resin containing an excess of the vulcanizing agent with a nitrated oil or resin and heating the mixture until vulcanization of the mixture is uniform.

10. The herein described process, consisting in grinding a vulcanized oil or resin containing an excess of sulfur, adding said ground oil to a vulcanizable oil at a vulcanizing temperature, stirring said oils, and maintaining said temperature until vulcanization is uniform.

11. The process described, consisting in heating oil or resin in the presence of an excess of sulfur until vulcanization is complete, adding the product together with clay to a vulcanizable oil, stirring the mixture, and heating it until vulcanization is uniform.

12. The process described, consisting in heating oil or resin in the presence of an excess of sulfur until vulcanization is complete, adding the product together with clay containing sulfur to a vulcanizable oil, stirring the mixture, and heating it until vulcanization is uniform.

13. The process described, consisting in heating oil or resin in the presence of an excess of sulfur until vulcanization is complete, mixing the product with a vulcanizable oil maintained at a vulcanizing temperature until vulcanization is uniform, allowing this final product to cool, and mixing therewith a product like that first mentioned.

14. The process described, consisting in heating oil or resin in the presence of an excess of sulfur until vulcanization is complete, mixing the product with a vulcanizable oil maintained at a vulcanizing temperature until vulcanization is uniform, allowing this final product to cool, and mixing therewith a product like that first mentioned and clay.

15. The process described, consisting in heating oil or resin in the presence of an excess of sulfur until vulcanization is complete, mixing the product with a vulcanizable oil maintained at a vulcanizing temperature until vulcanization is uniform, allowing this final product to cool below the vulcanizing temperature, and mixing therewith a clay having the characteristics of Long Island blue clay.

16. The process described, consisting in heating oil or resin, in the presence of an excess of sulfur, until vulcanization is complete, mixing the product with a vulcanizable oil maintained at a vulcanizing temperature until vulcanization is uniform, and mixing with this product clay and graphite.

17. The process of vulcanizing oil or resin, consisting in maintaining the oil or resin at a vulcanizing temperature in the presence of sulfur until the vulcanizing operation is completed, and mixing the product so produced with a nitrated oil or resin maintained at a vulcanizing temperature.

18. The process of vulcanizing oil or resin, consisting in maintaining the oil or resin at a vulcanizing temperature in the presence of an excess of sulfur until the vulcanizing operation is completed and mixing the product so produced with a nitrated oil or resin maintained at a vulcanizing temperature.

19. The process of vulcanizing oil or resin, consisting in maintaining the oil or resin at a vulcanizing temperature in the presence of sulfur until the vulcanizing operation is completed, and mixing the product so produced with a vulcanizable oil or resin and nitrated oil or resin maintained at a vulcanizing temperature.

20. The process of vulcanizing oil or resin, consisting in maintaining the oil or resin at a vulcanizing temperature in the presence of an excess of sulfur until the vulcanizing operation is completed and mixing the product so produced with a vulcanizable oil or resin and a nitrated oil or resin maintained at a vulcanizing temperature.

21. The process of vulcanizing oil or resin, consisting in maintaining the oil or resin at a vulcanizing temperature in the presence of a vulcanizing agent until the vulcanizing operation is completed, and mixing the product so obtained with a vulcanizable oil or resin and a nitrated oil or resin maintained at a vulcanizing temperature until part of the nitrogen in the nitrated oil is replaced by the vulcanizing agent.

22. The process of vulcanizing oil or resin, consisting in maintaining the oil or resin at a vulcanizing temperature in the presence of an excess of sulfur until the vulcanizing operation is complete, and mixing the product so obtained with a vulcanizable oil or resin and a nitrated oil or resin maintained at a vulcanizing temperature until part of the nitrogen in the nitrated oil is replaced by sulfur.

In testimony whereof I affix my signature in presence of two witnesses.

EDWIN TAYLOR.

Witnesses:
   H. L. GILLESPIE,
   JOHN M. COIT.